(12) United States Patent
Sugie

(10) Patent No.: US 11,454,254 B2
(45) Date of Patent: Sep. 27, 2022

(54) STATE DETERMINATION DEVICE OF LIQUID PUMPING APPARATUS, AND LIQUID PUMPING APPARATUS

(71) Applicant: TLV CO., LTD., Hyogo (JP)

(72) Inventor: Yuichi Sugie, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 270 days.

(21) Appl. No.: 16/826,734

(22) Filed: Mar. 23, 2020

(65) Prior Publication Data

US 2020/0224679 A1 Jul. 16, 2020

Related U.S. Application Data

(63) Continuation of application No. PCT/JP2018/026831, filed on Jul. 18, 2018.

(30) Foreign Application Priority Data

Sep. 25, 2017 (JP) .............................. JP2017-183268

(51) Int. Cl.
*F04F 1/06* (2006.01)
*F16T 1/24* (2006.01)

(52) U.S. Cl.
CPC ................ *F04F 1/06* (2013.01); *F16T 1/24* (2013.01); *F05B 2270/10* (2013.01); *F05B 2270/301* (2013.01)

(58) Field of Classification Search
CPC ........ F04F 1/00; F04F 1/06; F04F 1/14; F04F 1/18; F16T 1/20; F16T 1/22; F16T 1/24;

(Continued)

(56) References Cited

U.S. PATENT DOCUMENTS 5,655,888 A * 8/1997 Yumoto .................. F22D 11/06
417/132
6,244,829 B1 * 6/2001 Yumoto .................... F16T 1/24
137/413

(Continued)

FOREIGN PATENT DOCUMENTS

JP        H08145290 A      6/1996
JP        2002213399 A     7/2002
JP        2012037031 A     2/2012

OTHER PUBLICATIONS

International Search Report issued in PCT/JP2018/026831; dated Oct. 16, 2018.

*Primary Examiner* — Dominick L Plakkoottam
*Assistant Examiner* — Charles W Nichols
(74) *Attorney, Agent, or Firm* — Studebaker & Brackett PC

(57) ABSTRACT

A state determination device for a liquid pumping apparatus includes: a casing that forms a reservoir space; a feed valve that introduces working gas into the reservoir space; an exhaust valve that releases the working gas from the reservoir space; and a valve operating mechanism having a float arranged in the reservoir space, and performing a pumping stroke in which the liquid is pumped from the reservoir space under a pressure of the working gas and an inflow stroke in which the liquid flows into the reservoir space and the working gas is released. The state determination device further includes a pressure sensor that detects a pressure of the reservoir space, and a determination unit that determines whether the liquid pumping apparatus is in an operating state of performing the pumping stroke or the inflow stroke based on the pressure detected by the pressure sensor.

6 Claims, 3 Drawing Sheets

(58) Field of Classification Search
CPC .. F16T 1/48; F05B 2270/10; F05B 2270/301; F05B 2270/3011; F05B 2270/3013
See application file for complete search history.

(56) References Cited

U.S. PATENT DOCUMENTS

2007/0239371 A1* 10/2007 Halbinger ............. F04B 49/065
702/50
2013/0306572 A1* 11/2013 Potts ....................... C02F 3/006
210/117

* cited by examiner

STATE DETERMINATION DEVICE OF LIQUID PUMPING APPARATUS, AND LIQUID PUMPING APPARATUS

CROSS-REFERENCE TO RELATED APPLICATION

This is a continuation of PCT International Application PCT/JP2018/026831 filed on Jul. 18, 2018, which claims priority to Japanese Patent Application No. 2017-183268 filed on Sep. 25, 2017. The disclosures of these applications including the specifications, the drawings, and the claims are hereby incorporated by reference in their entirety.

FIELD

The present application relates to a state determination device that determines an operating state of a liquid pumping apparatus.

BACKGROUND

A liquid pumping apparatus that recovers liquid generated in a steam system and pumps the liquid to a utilization side under a pressure of working gas has been known as disclosed by, for example, Japanese Unexamined Patent Publication No. H08-145290. The liquid pumping apparatus of Japanese Unexamined Patent Publication No. H08-145290 includes a hermetic container which stores a drain generated in and flowed from the steam system, a float contained in the hermetic container, a feed valve for supplying steam, and an exhaust valve for releasing the steam. The float is connected to the feed valve and the exhaust valve via a valve operating mechanism (a float arm and a snap mechanism). In this liquid pumping apparatus, the float moves up and down according to the level of the drain, and the feed valve and the exhaust valve are operated in response to the upward and downward movements of the float. When the float moves up to a predetermined high level, the feed valve is opened, and the exhaust valve is closed. Then, the steam is introduced into the hermetic container, and the drain is pumped from the hermetic container under the pressure of the steam (pumping stroke). When the float moves down to a predetermined low level, the feed valve is closed, and the exhaust valve is opened. Then, the drain flows into the hermetic container to be stored therein, and the steam is released from the hermetic container (inflow stroke).

SUMMARY

In recent years, an operating state of a device has been monitored to detect signs of failure or abnormality of the device before the failure or abnormality actually occurs. In a device which works in different operating states such as the pumping stroke and the inflow stroke, like the above-described liquid pumping apparatus, criteria for detecting the signs differ depending on the operating state. For this reason, there has been a need for determining the operating state of the liquid pumping apparatus.

Under these circumstances, the present disclosure has been achieved to determine the operating state of a liquid pumping apparatus.

The present disclosure is directed to a state determination device for a liquid pumping apparatus including a casing, a feed valve, an exhaust valve, and a valve operating mechanism. The casing forms a reservoir space for storing liquid flowed thereto. The feed valve introduces working gas into the reservoir space. The exhaust valve releases the working gas from the reservoir space. The valve operating mechanism has a float arranged in the reservoir space. Further, the valve operating mechanism performs a pumping stroke in which the liquid is pumped from the reservoir space under a pressure of the working gas by opening the feed valve and closing the exhaust valve when the float moves up to a predetermined high level, and performs an inflow stroke in which the liquid flows into the reservoir space and the working gas is released from the reservoir space by closing the feed valve and opening the exhaust valve when the float moves down to a predetermined low level.

The state determination device includes a pressure sensor, and a determination unit. The pressure sensor detects a pressure of the reservoir space. The determination unit determines whether the liquid pumping apparatus is in an operating state of performing the pumping stroke or the inflow stroke based on the pressure detected by the pressure sensor.

The present disclosure is also directed to a liquid pumping apparatus including the above-described state determination device.

The state determination device and liquid pumping apparatus of the present application can determine the operating state (pumping stroke and inflow stroke) of the liquid pumping apparatus.

DESCRIPTION OF EMBODIMENTS

Embodiments of the present application will be described below with reference to the drawings. The embodiments below are merely exemplary ones in nature, and are not intended to limit the scope, applications, or use of the present disclosure.

Figure 1:
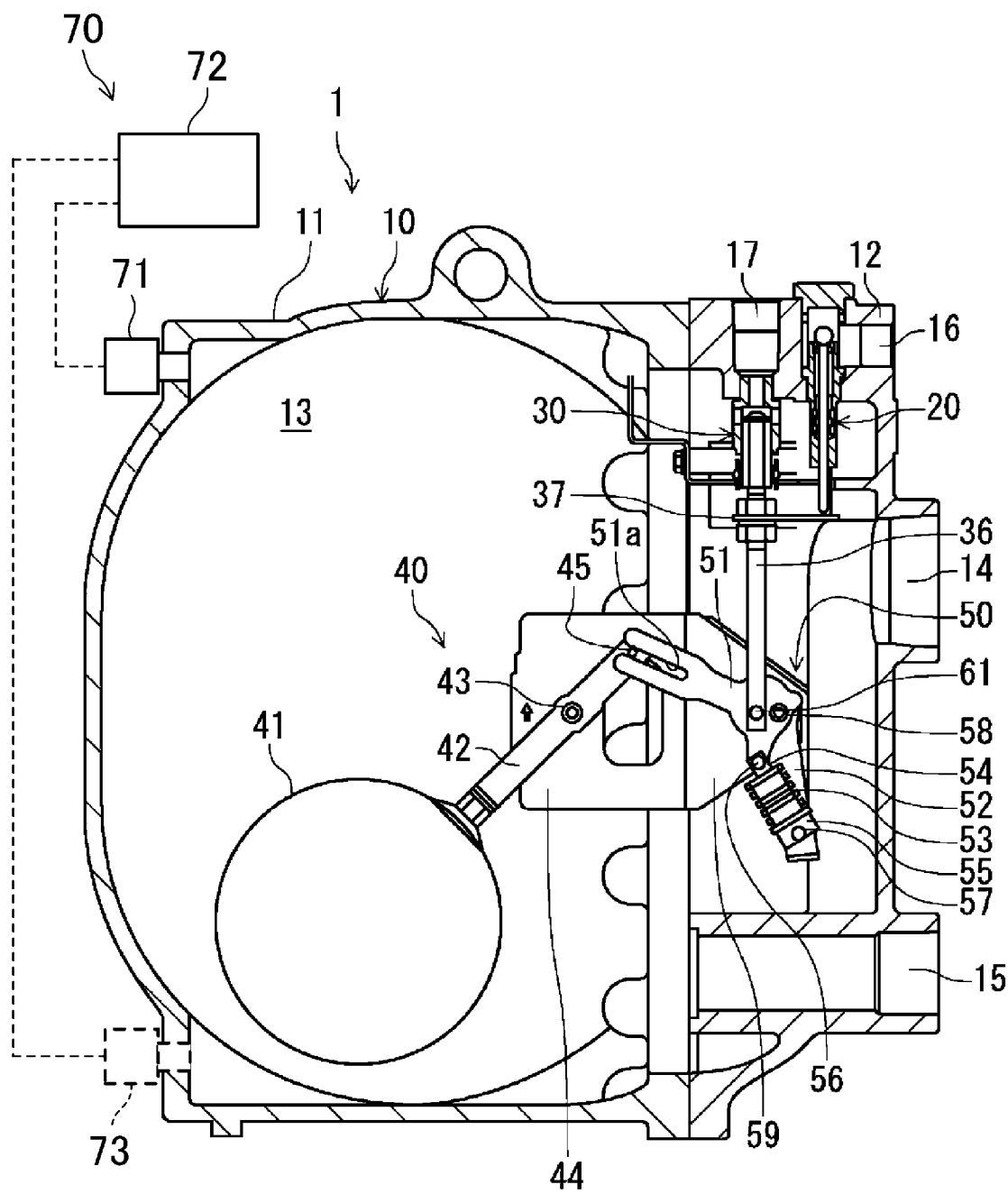
FIG. 1 is a cross-sectional view illustrating a schematic configuration of a liquid pumping apparatus according to an embodiment.

A liquid pumping apparatus 1 of the present embodiment is provided for a steam system, for example, and recovers a drain (condensation) generated as a result of condensation of steam to pump the drain to a boiler or a waste heat utilization system. Specifically, in the present embodiment, the drain corresponds to liquid recited in the claims of the present application. As shown in FIG. 1, the liquid pumping apparatus 1 includes a casing 10 which is a hermetic container, a feed valve 20, an exhaust valve 30, a valve operating mechanism 40, and a state determination device 70.

The casing 10 has a body 11 and a lid 12 connected together with bolts, and forms a reservoir space 13 for storing the drain (liquid) flowed thereto. The lid 12 is provided with a liquid inlet 14 into which the drain flows, a liquid outlet 15 from which the drain is pumped (released), a gas inlet 16 into which the steam is introduced, and a gas outlet 17 from which the steam is released. In this embodiment, the steam corresponds to working gas recited in the claims of the present application. The liquid inlet 14 is formed close to an upper portion of the lid 12, and the liquid outlet 15 is formed in a lower portion of the lid 12. Both of the gas inlet 16 and the gas outlet 17 are formed in the upper portion of the lid 12. All these ports such as the liquid inlet 14 communicate with the reservoir space 13.

Figure 2:
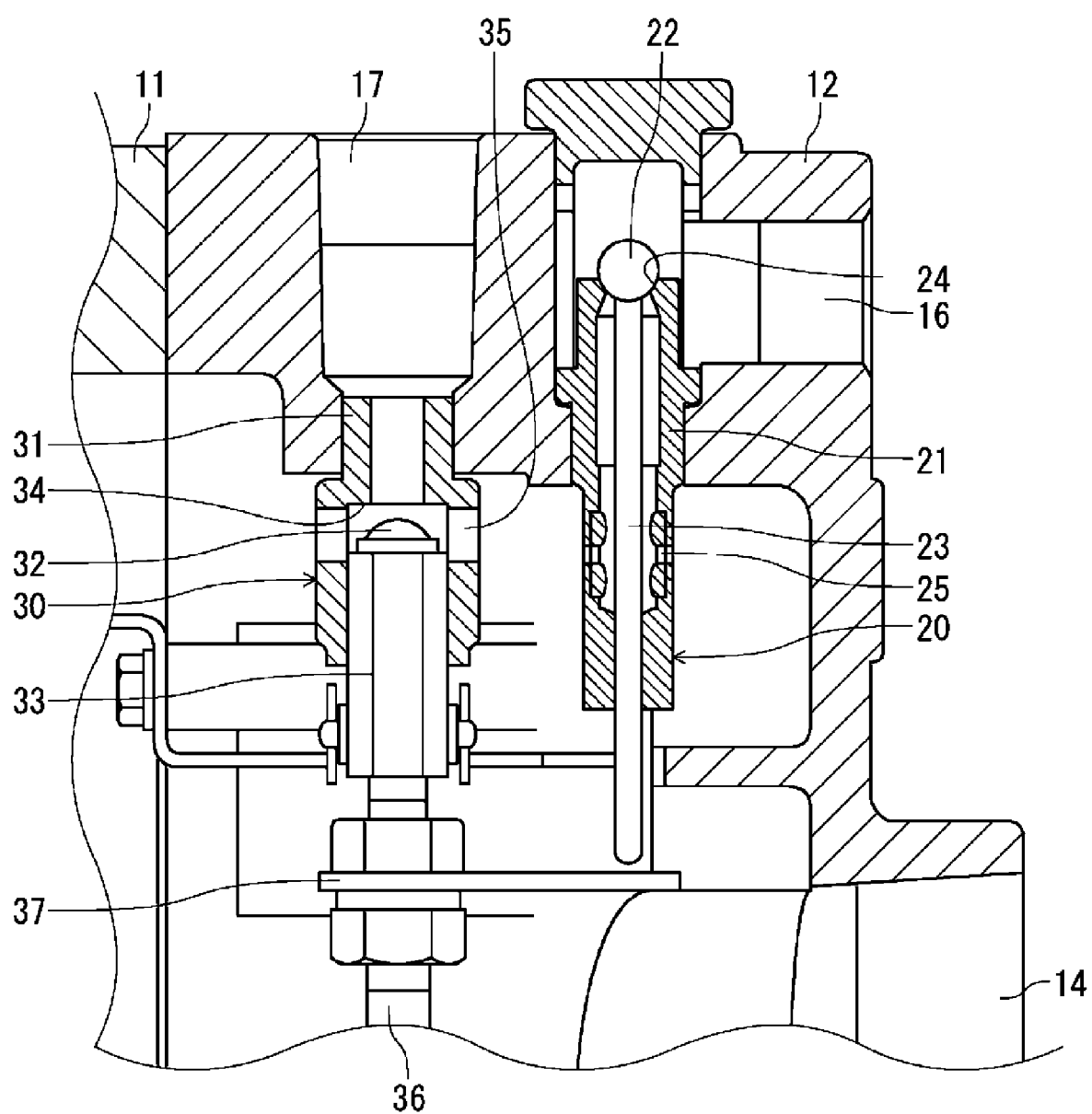
FIG. 2 is a cross-sectional view illustrating a schematic configuration of a feed valve and an exhaust valve in an enlarged scale.

As also shown in FIG. 2, the gas inlet 16 is provided with the feed valve 20, and the gas outlet 17 is provided with the exhaust valve 30. The feed valve 20 opens and closes the gas inlet 16, and the exhaust valve 30 opens and closes the gas outlet 17. The feed valve 20 introduces the steam from the gas inlet 16 into the reservoir space 13 to pump the drain from the reservoir space 13 through the liquid outlet 15. The exhaust valve 30 releases the steam that has introduced into the reservoir space 13 from the gas outlet 17.

The feed valve 20 has a valve case 21, a valve body 22, and a hoisting rod 23. The valve case 21 has a through hole penetrating in an axial direction thereof, and a valve seat 24 formed at the top of the through hole. An opening 25 that allows the through hole to communicate with the outside is formed in a middle portion of the valve case 21. The valve body 22 is formed in a spherical shape, and integrally provided at a top end of the hoisting rod 23. The hoisting rod 23 is inserted in the through hole of the valve case 21 to be movable up and down. When the hoisting rod 23 moves up, the valve body 22 of the feed valve 20 is separated from the valve seat 24 to open the gas inlet 16. When the hoisting rod 23 moves down, the valve body 22 is seated on the valve seat 24 to close the gas inlet 16.

The exhaust valve 30 has a valve case 31, a valve body 32, and a hoisting rod 33. The valve case 31 has a through hole penetrating in an axial direction thereof, and a valve seat 34 formed in a slightly upper portion of the through hole. An opening 35 that allows the through hole to communicate with the outside is formed in the valve case 31. The valve body 32 is formed in a substantially hemispherical shape, and integrally provided at a top end of the hoisting rod 33. The hoisting rod 33 is inserted in the through hole of the valve case 31 to be movable up and down. When the hoisting rod 33 moves up, the valve body 32 of the exhaust valve 30 is seated on the valve seat 34 to close the gas outlet 17. When the hoisting rod 33 moves down, the valve body 32 is separated from the valve seat 34 to open the gas outlet 17.

A valve operating rod 36 is coupled to a bottom end of the hoisting rod 33 of the exhaust valve 30. Specifically, the hoisting rod 33 of the exhaust valve 30 moves up and down as the valve operating rod 36 moves up and down. To the valve operating rod 36, a connector plate 37 extending to a region below the hoisting rod 23 of the feed valve 20 is attached. When the valve operating rod 36 moves up, the connector plate 37 lifts the hoisting rod 23 of the feed valve 20 up. When the valve operating rod 36 moves down, the connector plate 37 also moves down, and the valve operating rod 36 also moves down under its own weight. Specifically, when the valve operating rod 36 moves up, the feed valve 20 is opened (valve opening), and the exhaust valve 30 is closed (valve closing). When the valve operating rod 36 moves down, the feed valve 20 is closed (valve closing), and the exhaust valve 30 is opened (valve opening).

The valve operating mechanism 40 is arranged in the casing 10, and allows the valve operating rod 36 to move up and down to open and close the feed valve 20 and the exhaust valve 30. The valve operating mechanism 40 has a float 41 and a snap mechanism 50.

The float 41 is formed in a spherical shape, and has a lever 42 attached thereto. The lever 42 is rotationally supported by an axis 43 provided for a bracket 44. The lever 42 has an axis 45 provided at an end opposite to the float 41. The snap mechanism 50 has a float arm 51, a sub-arm 52, a coil spring 53, and two receiving members 54, 55. The float arm 51 has one end rotatably supported by an axis 58 provided for a bracket 59. The brackets 44, 59 are connected together with screws, and attached to the lid 12. The other end of the float arm 51 has a groove 51a, in which the axis 45 of the lever 42 fits. This configuration allows the float arm 51 to swing about the axis 58 as the float 41 moves up and down.

The float arm 51 has an axis 56. The sub-arm 52 has a top end rotatably supported by the axis 58, and a bottom end provided with an axis 57. The receiving member 54 is rotatably supported by the axis 56 of the float arm 51, and the receiving member 55 is rotatably supported by the axis 57 of the sub-arm 52. The coil spring 53 in a compressed state is attached between the receiving members 54, 55. The sub-arm 52 is provided with an axis 61, to which a bottom end of the valve operating rod 36 is coupled.

The valve operating mechanism 40 configured in this manner is displaced as the float 41 moves up and down, and allows the valve operating rod 36 to move up and down to open and close the feed valve 20 and the exhaust valve 30. Thus, the valve operating mechanism 40, particularly in the liquid pumping apparatus 1, positions the float 41 at the bottom of the reservoir space 13 when no drain is stored in the reservoir space 13. In this state, the valve operating rod 36 has moved down, the feed valve 20 is closed, and the exhaust valve 30 is open. When generated in the steam system, the drain flows into the liquid inlet 14 to be stored in the reservoir space 13 (inflow stroke). In the inflow stroke, the float 41 moves up as the amount of drain stored in the reservoir space 13 increases. In addition, the steam is released from the gas outlet 17 as the amount of drain stored in the reservoir space 13 increases. Then, when the float 41 moves up to a predetermined high level (upper reversal position), the snap mechanism 50 causes the valve operating rod 36 to move up. As a result, the feed valve 20 is opened, the exhaust valve 30 is closed, the inflow stroke ends, and a pumping stroke starts.

When the feed valve 20 is opened, the steam (high-pressure steam) in the steam system is introduced into an upper portion of the reservoir space 13 (space above the drain) through the gas inlet 16. The drain stored in the reservoir space 13 is then pushed downward by the pressure of the introduced gas, and pumped from the liquid outlet 15 (pumping stroke). The drain pumped by the liquid pumping apparatus 1 is supplied to a boiler or a waste heat utilization system. When the drain is pumped (released) out and the level of the drain in the reservoir space 13 is lowered, the float 41 moves down. Then, when the float 41 moves down to a predetermined low level (lower reversal position), the snap mechanism 50 causes the valve operating rod 36 to move down. As a result, the feed valve 20 is closed, the exhaust valve 30 is opened, the pumping stroke ends, and the inflow stroke restarts. That is, again, the drain flows into the liquid inlet 14 to be stored in the reservoir space 13, and the steam is released from the reservoir space 13 through the gas outlet 17.

In this manner, the valve operating mechanism 40 in the liquid pumping apparatus 1 opens and closes the feed valve 20 and the exhaust valve 30 to alternately perform the inflow stroke and the pumping stroke.

The state determination device 70 is configured to determine the operating state of the liquid pumping apparatus 1, i.e., which of the inflow stroke and the pumping stroke is performed. The state determination device 70 includes a pressure sensor 71 and a determination unit 72.

The pressure sensor 71 detects the pressure of the reservoir space 13. The pressure sensor 71 is provided at an upper portion of the body 11 of the casing 10, and communicates with an almost uppermost portion of the reservoir space 13.

Specifically, the pressure sensor 71 detects the pressure of a gaseous layer in the reservoir space 13, i.e., the pressure of a region of the reservoir space 13 where the steam, which is one of the drain (liquid) or the steam (working gas), is present.

The determination unit 72 determines whether the liquid pumping apparatus 1 is in an operating state of performing the inflow stroke or the pumping stroke based on the pressure detected by the pressure sensor 71. The determination unit 72 successively receives the pressure detected by the pressure sensor 71. More specifically, the determination unit 72 determines that the pumping stroke is performed from when a predetermined amount of pressure rise is detected to when a predetermined amount of pressure drop is detected by the pressure sensor 71. In addition, the determination unit 72 determines that the inflow stroke is performed from when a predetermined amount of pressure drop is detected to when a predetermined amount of pressure rise is detected by the pressure sensor 71.

Figure 3:
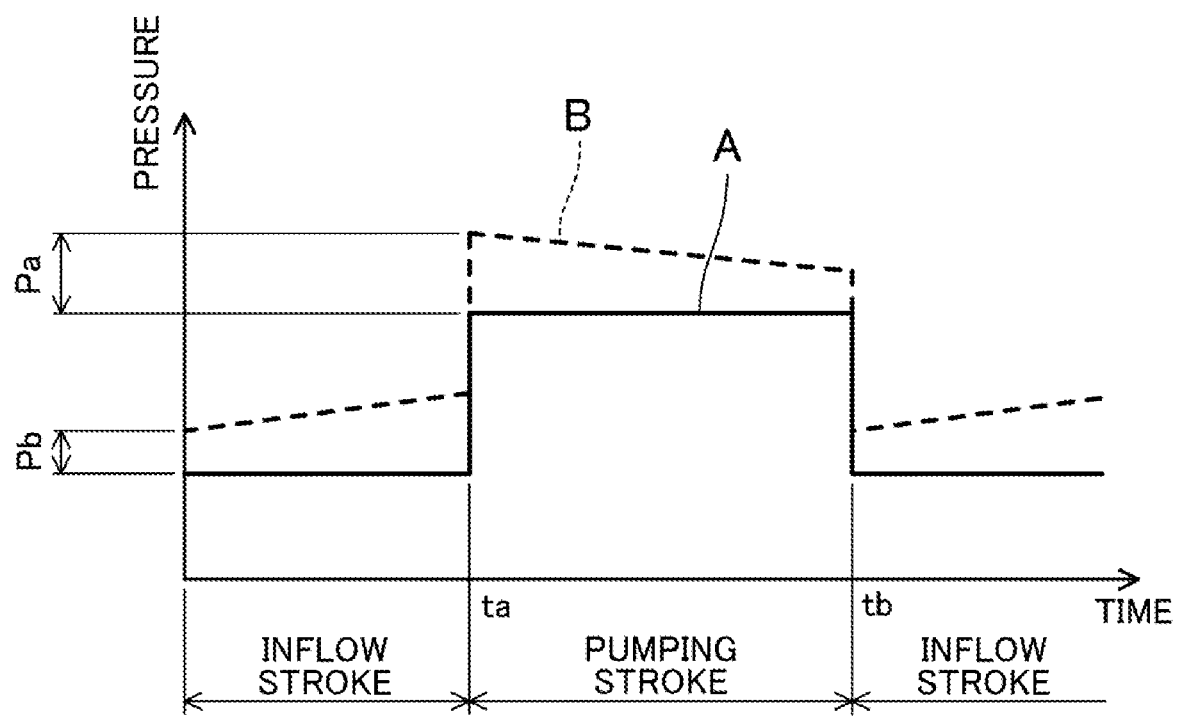
FIG. 3 is a graph showing a change in pressure of a reservoir space over time.

Referring to FIG. 3, how the determination unit 72 makes the determination will be described in detail below. The pressure detected by the pressure sensor 71 (pressure of the gaseous layer in the reservoir space 13) changes over time as indicated by a solid line A shown in FIG. 3. In the inflow stroke, the drain flows into the reservoir space 13 and the steam is released from the reservoir space 13, and thus, the pressure detected by the pressure sensor 71 remains at a substantially constant value. When the float 41 moves up to the predetermined high level, the inflow stroke is switched to the pumping stroke (upper reversal point ta). When the stroke is switched to the pumping stroke, high-pressure steam is introduced into the reservoir space 13, and the pressure of the high-pressure steam pumps the drain out. Thus, the pressure detected by the pressure sensor 71 becomes higher than that detected in the inflow stroke. Specifically, at the upper reversal point ta, the pressure sensor 71 detects the pressure instantaneously increased by a predetermined amount. In the pumping stroke, the pressure detected by the pressure sensor 71 remains at a substantially constant value.

When the float 41 moves down to the predetermined low level, the pumping stroke is switched again to the inflow stroke (lower reversal point tb). When the stroke is switched to the inflow stroke, the high-pressure steam is not introduced any more, and again, the drain flows into the reservoir space and the steam is released from the reservoir space as described above. Thus, the pressure detected by the pressure sensor 71 becomes lower than that detected in the pumping stroke. Specifically, at the lower reversal point tb, the pressure sensor 71 detects the pressure instantaneously decreased by a predetermined amount.

Thus, the determination unit 72 can determine that the pumping stroke is performed from when a predetermined amount of pressure rise is detected to when a predetermined amount of pressure drop is detected by the pressure sensor 71. Further, the determination unit 72 can determine that the inflow stroke is performed from when a predetermined amount of pressure drop is detected to when a predetermined amount of pressure rise is detected by the pressure sensor 71. In this way, the operating state of the liquid pumping apparatus 1 can be determined.

The pressure sensor 71, which is configured to detect the pressure of the gaseous layer in the reservoir space 13, can detect the pressure without being influenced by, for example, a shake of the drain (liquid) in the reservoir space 13. Therefore, determination can be performed with high accuracy.

In the liquid pumping apparatus 1 of the above embodiment, the pressure sensor 71 may be attached to a different position. Specifically, as shown in FIG. 1, for example, a pressure sensor 73 that communicates with a lower portion of the reservoir space 13 may be provided. In this case, the pressure sensor 73 communicates with the drain (liquid) in the reservoir space 13. Thus, as indicated by a broken line B in FIG. 3, the pressure sensor 73 detects a pressure which is higher by a head Pa, Pb of the drain than that detected by the pressure sensor 71 of the above embodiment. In the inflow stroke, the drain flows into the reservoir space to be stored therein, which gradually raises the head Pb of the drain and the pressure detected by the pressure sensor 73. In the pumping stroke, the drain is pumped (released) from the reservoir space, which gradually lowers the head Pa of the drain and the pressure detected by the pressure sensor 73. In this case, the pressure sensor 73 also detects the pressure instantaneously increased by a predetermined amount at the upper reversal point ta, and the pressure instantaneously decreased by a predetermined amount at the lower reversal point tb. Therefore, the operating state of the liquid pumping apparatus 1 can be determined in the same manner as described in the above embodiment.

In the present disclosure, two pressure sensors, namely, the pressure sensors 71 and 73, may be provided so that they can determine the operating state in the same manner.

In the above embodiment, it has been described that the working gas is the steam. However, as a matter of course, any other types of gas may be used in the present disclosure.

In the above embodiment, it has been described that the liquid to be pumped is the drain. However, any other types of liquid may be used in the present disclosure.

The present application is useful for a state determination device that determines an operating state of a liquid pumping apparatus.

What is claimed is:

1. A state determination device for a liquid pumping apparatus, comprising:
a casing that forms a reservoir space for storing liquid flowed thereto;
a feed valve that introduces working gas into the reservoir space;
an exhaust valve that releases the working gas from the reservoir space; and
a valve operating mechanism having a float arranged in the reservoir space, and performing a pumping stroke in which the liquid is pumped from the reservoir space under a pressure of the working gas by opening the feed valve and closing the exhaust valve when the float moves up to a predetermined high level, and an inflow stroke in which the liquid flows into the reservoir space and the working gas is released from the reservoir space by closing the feed valve and opening the exhaust valve when the float moves down to a predetermined low level, wherein
the state determination device comprises:
a pressure sensor that detects a pressure of the reservoir space; and
a determination unit that determines whether the liquid pumping apparatus is in a first operating state of performing the pumping stroke or in a second operating state of performing the inflow stroke based on the pressure detected by the pressure sensor, and the determination unit determines that the liquid pumping apparatus is in the first operating state in which the pumping stroke is performed from when a predetermined amount of pressure rise is detected to when a predetermined amount of pressure drop is detected by the pressure sensor, and determines that the liquid pumping apparatus is in the second operating state in which the inflow stroke is performed from when a predetermined amount of pressure drop is detected to when a predetermined amount of pressure rise is detected by the pressure sensor.

2. The state determination device of claim 1, wherein the pressure sensor detects a pressure of a gaseous layer in the reservoir space.

3. The state determination device of claim 1, wherein
the determination unit determines that the liquid pumping apparatus is in the first operating state in which the pumping stroke is performed from when a predetermined amount of pressure rise is detected by detecting an upper reversal point (ta) in which pressure increases by a predetermined amount due to high-pressure steam being introduced into the reservoir space, and
the determination unit determines that the liquid pumping apparatus is in the second operating state in which the inflow stroke is performed from when a predetermined amount of pressure drop is detected by detecting a lower reversal point (tb) in which pressure decreases by a predetermined amount due to high-pressure steam not being introduced into the reservoir space.

4. A liquid pumping apparatus, comprising:
a casing that forms a reservoir space for storing liquid flowed thereto;
a feed valve that introduces working gas into the reservoir space;
an exhaust valve that releases the working gas from the reservoir space;
a valve operating mechanism having a float arranged in the reservoir space, and performing a pumping stroke in which the liquid is pumped from the reservoir space under a pressure of the working gas by opening the feed valve and closing the exhaust valve when the float moves up to a predetermined high level, and an inflow stroke in which the liquid flows into the reservoir space and the working gas is released from the reservoir space by closing the feed valve and opening the exhaust valve when the float moves down to a predetermined low level; and
a state determination device, comprising:
a pressure sensor that detects a pressure of the reservoir space; and
a determination unit that determines between whether the liquid pumping apparatus is in a first operating state of performing the pumping stroke or in a second operating state of performing the inflow stroke based on the pressure detected by the pressure sensor, and the determination unit determines that the liquid pumping apparatus is in the first operating state in which the pumping stroke is performed from when a predetermined amount of pressure rise is detected to when a predetermined amount of pressure drop is detected by the pressure sensor, and determines that the liquid pumping apparatus is in the second operating state in which the inflow stroke is performed from when a predetermined amount of pressure drop is detected to when a predetermined amount of pressure rise is detected by the pressure sensor.

5. The liquid pumping apparatus of claim 4, wherein the pressure sensor detects a pressure of a gaseous layer in the reservoir space.

6. The state determination device of claim 4, wherein
the determination unit determines that the liquid pumping apparatus is in the first operating state in which the pumping stroke is performed from when a predetermined amount of pressure rise is detected by detecting an upper reversal point (ta) in which pressure increases by a predetermined amount due to high-pressure steam being introduced into the reservoir space, and
the determination unit determines that the liquid pumping apparatus is in the second operating state in which the inflow stroke is performed from when a predetermined amount of pressure drop is detected by detecting a lower reversal point (tb) in which pressure decreases by a predetermined amount due to high-pressure steam not being introduced into the reservoir space.

* * * * *